(12) United States Patent
Makgeru

(10) Patent No.: US 11,626,783 B2
(45) Date of Patent: Apr. 11, 2023

(54) ELECTRIC POWER GENERATOR COMPRISING TWO STATORS AND A ROTOR

(71) Applicant: THE TRUSTEES FOR THE TIME BEING OF THE KMN FULFILMENT TRUST, Benoni (ZA)

(72) Inventor: Kabu Walter Makgeru, Benoni (ZA)

(73) Assignee: THE TRUSTEES FOR THE TIME BEING OF THE KMN FULFILMENT TRUST

( * ) Notice: Subject to any disclaimer, the term of this patent is extended or adjusted under 35 U.S.C. 154(b) by 0 days.

(21) Appl. No.: 17/291,548

(22) PCT Filed: Jun. 23, 2020

(86) PCT No.: PCT/IB2020/055916
§ 371 (c)(1),
(2) Date: May 5, 2021

(87) PCT Pub. No.: WO2020/261113
PCT Pub. Date: Dec. 30, 2020

(65) Prior Publication Data
US 2022/0109355 A1 Apr. 7, 2022

(30) Foreign Application Priority Data
Jun. 25, 2019 (ZA) .................................. 2019/04106
Sep. 25, 2019 (ZA) .................................. 2019/06297

(51) Int. Cl.
*H02K 16/04* (2006.01)
*H02K 21/12* (2006.01)
(Continued)

(52) U.S. Cl.
CPC .................................. *H02K 16/04* (2013.01)

(58) Field of Classification Search
CPC .......... H02K 21/12; H02K 16/04; H02K 7/20; H02K 1/27
(Continued)

(56) References Cited

U.S. PATENT DOCUMENTS 6,459,185 B1 * 10/2002 Ehrhart .................. H02K 5/203
310/156.45
7,683,515 B2   3/2010 Leiber et al.
(Continued)

OTHER PUBLICATIONS

Authorized officer Lee Young, International Search Report and Written Opinion in PCT/IB2020/055916 filed Jun. 23, 2020, 5 pages.

*Primary Examiner* — Jose A Gonzalez Quinones
(74) *Attorney, Agent, or Firm* — Fish & Richardson P.C.

(57) ABSTRACT

An electric power generator comprises a rotor and a plurality of stators arranged coaxially and concentrically about a central axis. There is an inner stator provided radially inwardly of the rotor separated by an inner airgap and an outer stator provided radially outwardly of the rotor separated by an outer airgap. The rotor includes a plurality of magnetic pole structures configured to provide or generate a magnetic field having plurality of magnetic poles. The rotor is not of uniform cross-sectional thickness, wherein: an inner surface of the rotor bulges inwardly at the pole structures, the inner airgap being non-uniform as it is radially shorter at the pole structures and longer in between the pole structures; and an outer surface of the rotor bulges outwardly at the pole structures, the outer airgap being non-uniform as it is radially shorter at the pole structures and longer in between the pole structures.

15 Claims, 10 Drawing Sheets

(51) Int. Cl.
*H02K 1/27* (2022.01)
*H02K 7/20* (2006.01)

(58) Field of Classification Search
USPC .......................................... 310/114, 156.35
See application file for complete search history.

(56) References Cited

U.S. PATENT DOCUMENTS

| | | | |
|---|---|---|---|
| 9,006,949 B2* | 4/2015 | Kusase | H02K 16/00 |
| | | | 310/112 |
| 2013/0264895 A1* | 10/2013 | Kondou | H02K 1/06 |
| | | | 310/46 |
| 2017/0019006 A1 | 1/2017 | Misu et al. | |

* cited by examiner

ELECTRIC POWER GENERATOR COMPRISING TWO STATORS AND A ROTOR

FIELD OF INVENTION

This invention relates to electric power generators and specifically it relates to an electric power generator with two stators and a rotor in a stator-rotor-stator configuration.

BACKGROUND OF INVENTION

In a prior art electric power generators, usually a single rotor and a single stator are provided. As is well-known, the rotor generates a magnetic field and rotates and the rotating magnetic field induces current in windings provided in stator which remains stationary. In this configuration, the magnetic field from the rotor is directed to the stator in only one direction, that is, radially inwardly only or radially outwardly only.

The Inventor is aware of the generator with a twin-stator, single rotor configuration. U.S. Pat. No. 6,297,575 discloses a three-layered structure where the magnetic field source from the rotor is located between two stators and is a common magnetic field source for those stators to interact with. This disclosure aimed at using the structure to perform either generator function or motor function or a combination of the motor and generator functions.

However, the disclosure of U.S. Pat. No. 6,297,575 lacks technical specifications about airgaps. When this unit is operated as an electric power generator, there seems to be no regard to the effect of the airgaps and their interactions. This disclosure does not look at the airgaps between the different layers especially in regard to generating electricity as airgaps may be critical to power generation parameters. The Inventor believes that this is a weakness in U.S. Pat. No. 6,297,575 and wishes to address this.

The present invention aims to solve the above mentioned weaknesses of not optimising the airgaps to improve the performance and the quality of the generated power.

SUMMARY OF THE INVENTION

Accordingly, the invention provides an electric power generator comprising a rotor and a plurality of stators, wherein:
the rotor and the plurality of stators are arranged coaxially and concentrically about a central axis;
the plurality of stators includes an inner stator provided radially inwardly of the rotor, the inner stator and the rotor being separated by an inner airgap;
the plurality of stators includes an outer stator provided radially outwardly of the rotor, the outer stator and the rotor being separated by an outer airgap;
each of the inner and outer stators have respective windings configured to have electric current induced therein;
the rotor includes a plurality of magnetic pole structures configured to provide or generate a magnetic field having plurality of magnetic poles configured, in use, to induce the current in the windings; and
the rotor is not of uniform cross-sectional thickness, wherein:
an inner surface of the rotor bulges radially inwardly at the pole structures, the inner airgap thus being non-uniform in that it is radially shorter at the pole structures and radially longer in between the pole structures; and
an outer surface of the rotor bulges radially outwardly at the pole structures, the outer airgap thus being non-uniform in that it is radially shorter at the pole structures and radially longer in between the pole structures.

Differently stated, the outer surface of each magnetic pole structure may have a more aggressive curvature—or smaller radius of curvature—than a displacement arc which it describes. The inner surface of each magnetic pole structure may be flat or at least have a gentler curvature—or larger radius of curvature—than a displacement arc which it describes.

The electric power generator may have only a single rotor and exactly two stators.

The electric power generator may include a back-iron. The back-iron may provide a return path and assist in closing a magnetic circuit from the magnetic field of the rotor radiating outwardly. The back-iron may be provided around the outer stator. There may be a return path in the outer stator and in the inner stator to complete the magnetic circuit. The inner return path may be located in the inner surface of the inner stator and the outer return path may be situated in the outer surface of the outer stator.

It may be noted that an advantage of the present disclosure is that the magnetic field generated by the rotor is utilised both inwardly of the rotor (by the inner stator) and outwardly of the rotor (by the outer stator). This may lead to more efficient conversion of the magnetic field to electrical current.

The outer airgap may be, on average, radially longer or wider than the inner airgap. The inner airgap may be 5-50 mm at its radially shortest point. The inner airgap may be 10-90 mm at its radially longest point. The outer airgap may be 20-100 mm at its radially shortest point. The outer airgap may be 30-165 mm at its radially longest point.

The inner stator may include teeth at a radially outward surface thereof to accommodate its windings. The windings may therefore be proximate to, and opposed to, a radially inner surface of the rotor.

The outer stator may include teeth at a radially inner surface thereof to accommodate its windings. The windings may therefore be proximate to, and opposed to, a radially outer surface of the rotor.

The respective teeth of the inner and outer stators may be equal or radially aligned; instead, the respective teeth of the inner and outer stators may be unequal or radially misaligned.

The rotor may include intermediate support structures between adjacent magnetic pole structures to provide a constant or uninterrupted circumferentially extending rotor. The support structures may be of ferrous material to conduct or enhance the magnetic field. Instead, the support structures may be of non-ferrous material which may prevent a magnetic field short circuit.

The inner stator may present a generally circular outer surface. Accordingly, the inner airgap may be generally uniform at its inner boundary (provided by the outer surface of the inner stator) but non-uniform at its outer boundary (provided by the inner surface of the rotor).

The outer stator may present a generally circular inner surface. Accordingly, the outer airgap may be generally uniform at its outer boundary (provided by the inner surface of the outer stator) but non-uniform at its inner boundary (provided by the outer surface of the rotor).

An advantage of the non-uniform airgaps is that they may provide better or more desirable output waveforms. This may include smoother waveforms, less cogging, and/or less harmonic distortion, etc.

DETAILED DESCRIPTION (SPECIFICATION)

Figure 1:
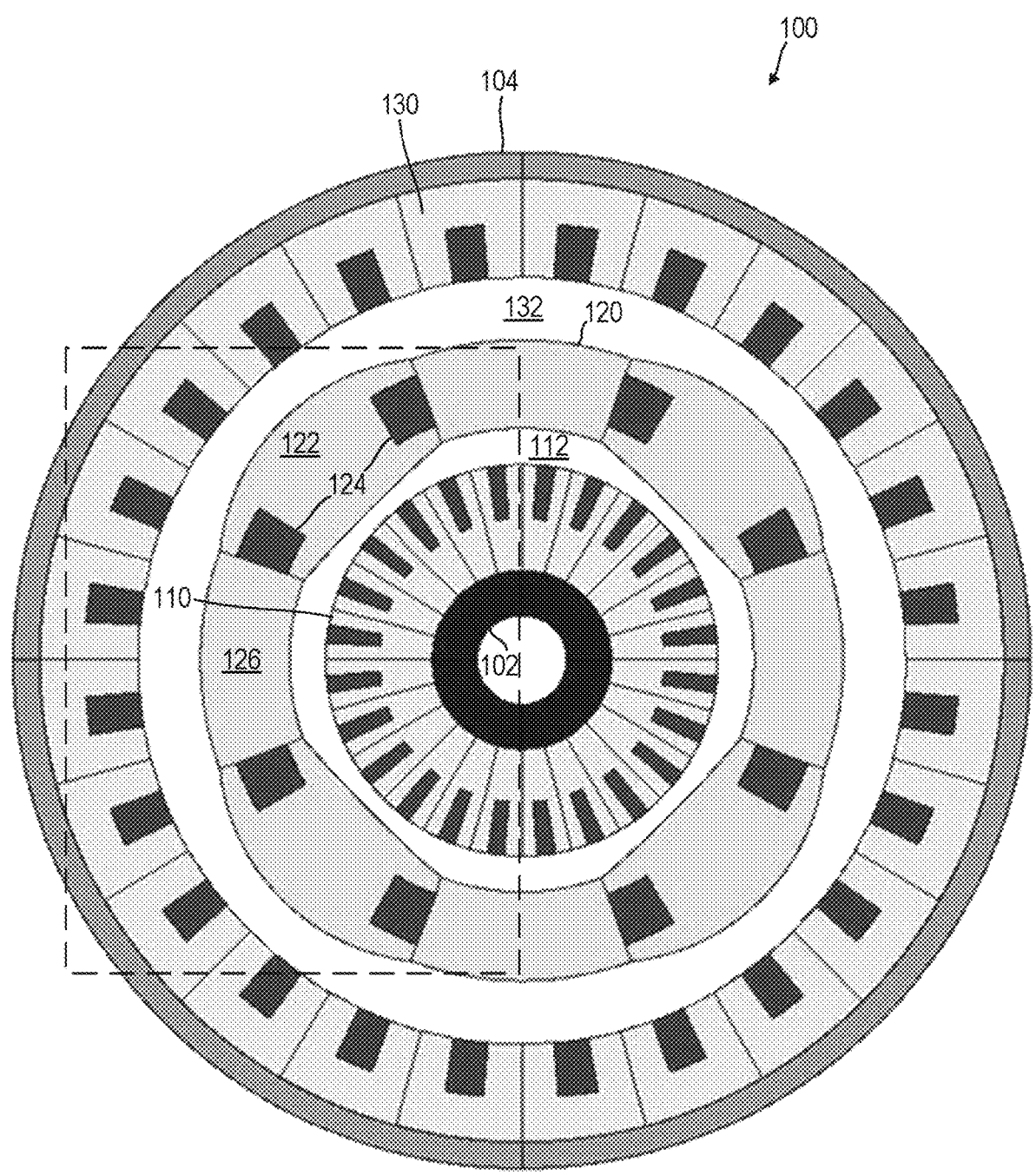
FIG. 1 shows a schematic cross-sectional view of an electric power generator comprising a rotor and two stators, in accordance with the invention.
Figure 2:
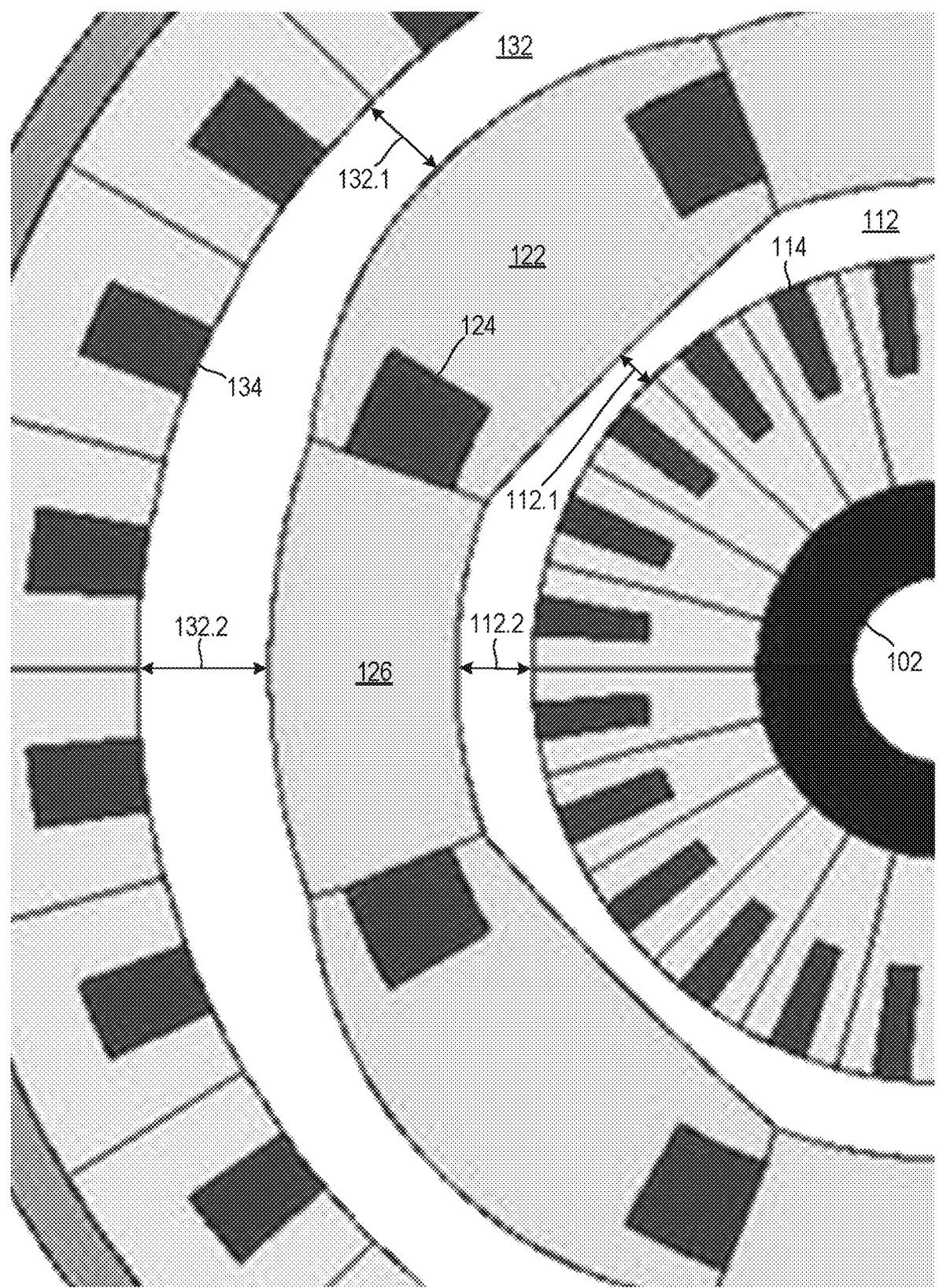
FIG. 2 shows an enlarged view of a section of the electric power generator of FIG. 1.

FIGS. 1-2 shows an electric power generator (merely "generator" for short) 100 in accordance with the invention. The generator 100 has a central axle 102 defining a central axis at its radially inner centre and a back iron 104 at its radially outer surface. The generator 100 also has many features which are common to generators in general, like bearings, an axle, a frame, input drive, output wiring, etc., which are not illustrated but will be understood by one skilled in the art that they may form part of the invention.

The generator 100 has an inner stator 110, and intermediate rotor 120, and an outer stator 130. These may be thought of as three concentric "layers" of the generator 100. The rotor 120 and stators 110, 130 are coaxial about the central axis. The inner stator 110 is provided radially inwardly of the rotor 120, the inner stator 110 and the rotor 120 being separated by an inner airgap 112. The outer stator 130 is provided radially outwardly of the rotor 120, the outer stator 130 and the rotor 120 being separated by an outer airgap 132.

Each of the inner and outer stators 110, 130 have respective windings 114, 134 configured to have electric current induced therein. Correspondingly, the rotor 120 includes a plurality of magnetic pole structures 122, 124 configured to provide or generate a magnetic field having plurality of magnetic poles configured, in use, to induce the current in the windings 114, 134. Each magnetic pole may comprise a magnetic body 122 with embedded field windings 124, the magnetic pole structure 122, 124 thus being an electromagnetic in this example (although in other examples, it could be a permanent magnet). The rotor 120 includes intermediate support structures 126 to provide structural support between the magnetic pole structures 122, 124.

The rotor 120 is generally annular, but not uniformly so; more specifically, the rotor 120 is not of uniform cross-sectional thickness. This may be clearer in FIG. 2 which shows an enlarged section of the generator 100. An inner surface of the rotor 120 bulges radially inwardly at the pole structures 122, 124, the inner airgap 112 thus being non-uniform in that it is radially shorter (indicated by arrow 112.1) at the pole structures 122, 124. The inner airgap 112 is radially longer (indicated by arrow 112.2) in between the pole structures 122, 124, that is, at—or radially aligned with—the intermediate structures 126.

The outer airgap 132 has a similar configuration although it is, an average, wider/radially longer than the inner airgap 112. More specifically, an outer surface of the rotor 120 bulges radially outwardly at the pole structures 122, 124, the outer airgap 132 thus being non-uniform in that it is radially shorter (indicated by arrow 132.1) at the pole structures 122, 124 and radially longer (indicated by arrow 132.2) in between the pole structures 122, 124 at the intermediate structures 126.

The distances may be in the following ranges indicated in Table 1:

TABLE 1

| Characteristic | Range |
| --- | --- |
| Shortest distance (112.1) of inner airgap (112) | 5-50 mm |
| Longest distance (112.2) of inner airgap (112) | 10-90 mm |
| Shortest distance (132.1) of outer airgap (132) | 20-100 mm |
| Longest distance (132.2) of outer airgap (132) | 30-165 mm |

Figure 3:
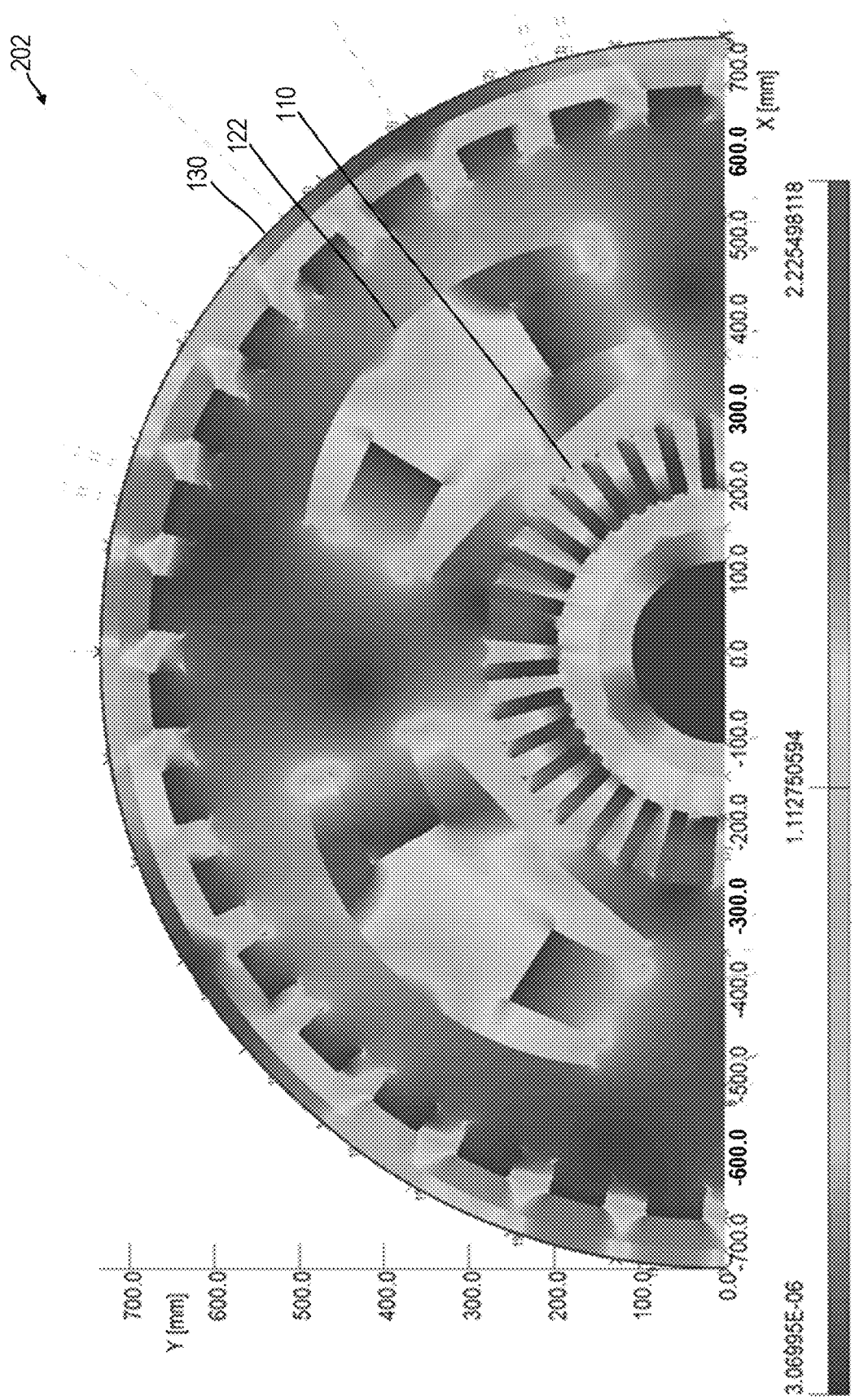
FIG. 3 shows a schematic flux density heatmap of the generator of FIG. 1.

A shape of the magnetic body 122 is also clear in FIG. 3 showing magnetic flux density. The magnetic body 122 has a flat inner surface (which is considered to be an inward bulge relative to a more conventional arcuately curved inner surface which would be concentric with, and equi-distantly spaced from, the central axis). In other words, the inner surface has of the magnetic body 122 has less than a displacement arc described by the inner surface, in use.

Similarly, the outer surface of the magnetic body 122 is more curved (or has a smaller radius of curvature) than would a more conventional constantly-curved outer surface would have; this is considered an outward bulge as the curvature to tighter than a displacement arc described by the outer surface of the magnetic body 122.

The Inventor has performed simulations and tests of the generator 100. The results of the simulations are outlined in FIGS. 3-11. The specific parameters of the simulations are provided in Table 2:

TABLE 2

| Characteristic | Value |
| --- | --- |
| Type of Analysis | Current feeding analysis |
| Field current | 150 A |
| Turns per phase | 12 |
| Skewing angle | 0° |
| Damper winding | Without damper winding |
| Speed in RPM | 1500 RPM |
| Slot wedge material | Non-Magnetic |
| Inner airgap (112) | 35 mm at shortest distance (112.1), 75 mm at longest distance (112.2) |
| Outer airgap (132) | 90 mm at shortest distance (132.1), 117.5 mm at longest distance (132.2) |
| Coil pitch | 6 slots |
| Field turns/pole | 250 |

TABLE 2-continued

| Characteristic | Value |
| --- | --- |
| Core length | 640 mm |
| Back iron (104) | 35 mm lamination sheet + 20 mm structural steel |

One of the advantages of the generator 100 is that is produces and electrical output (that is, voltage and current characteristics of the output) with low total harmonic distortion (THD) without the need for any correcting, regulating, or rectifying circuitry.

Figure 4:
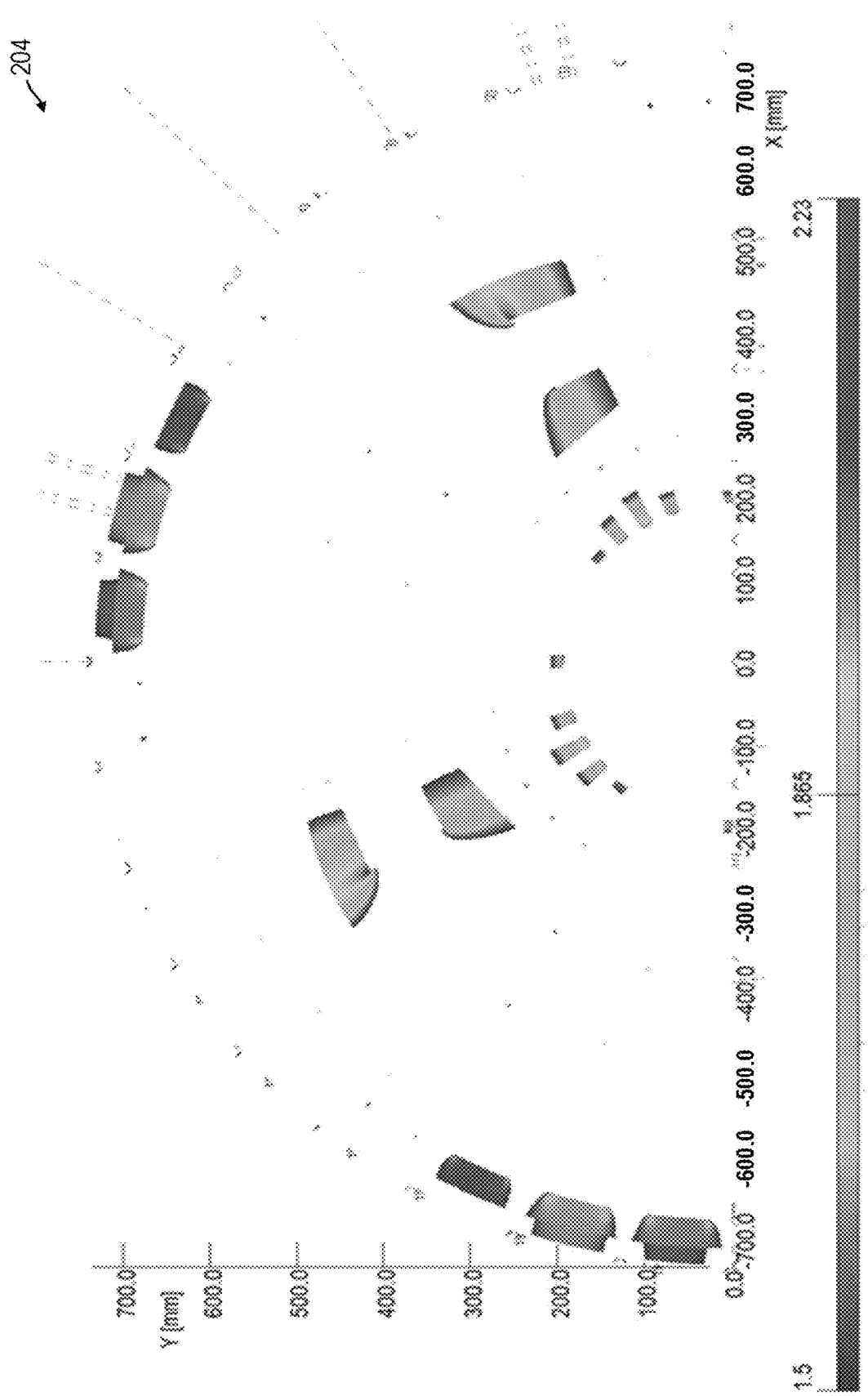
FIG. 4 shows a schematic flux density heatmap, with thresholds, of the generator of FIG. 1.
Figure 5:
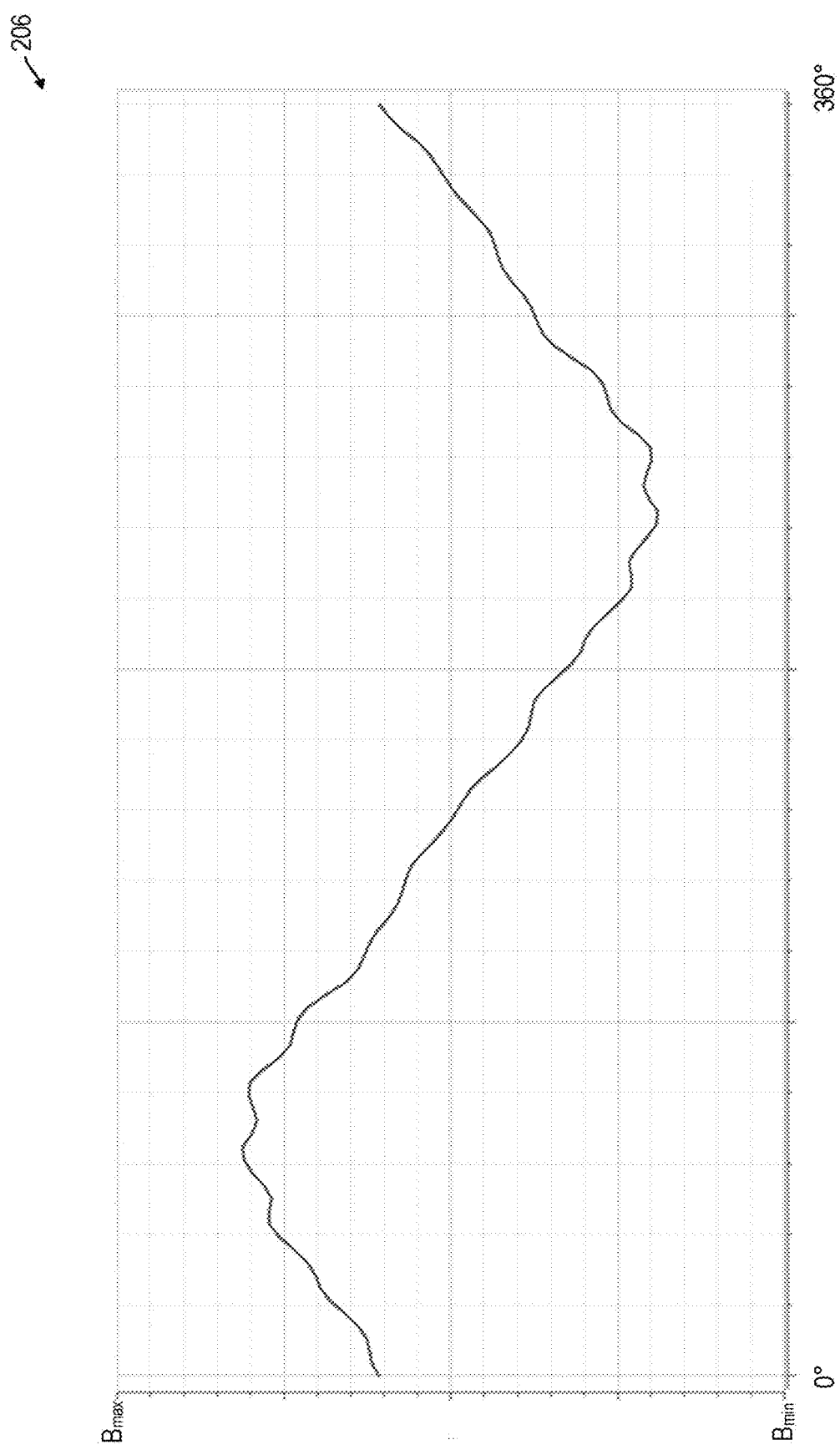
FIG. 5 shows a graph of flux density between the inner stator and rotor of the generator of FIG. 1.
Figure 6:
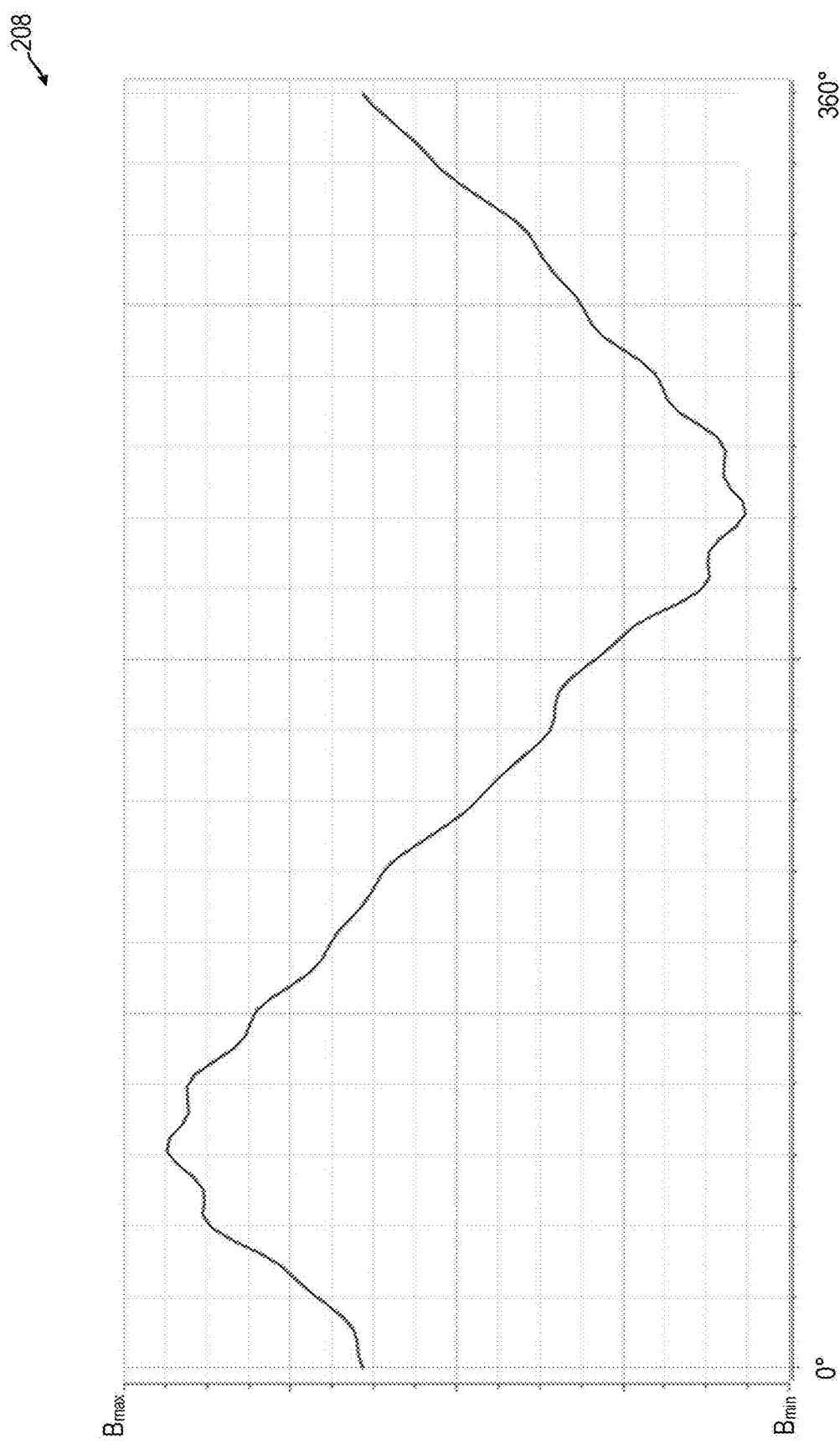
FIG. 6 shows a graph of flux density between the outer stator and rotor of the generator of FIG. 1.
Figure 7:
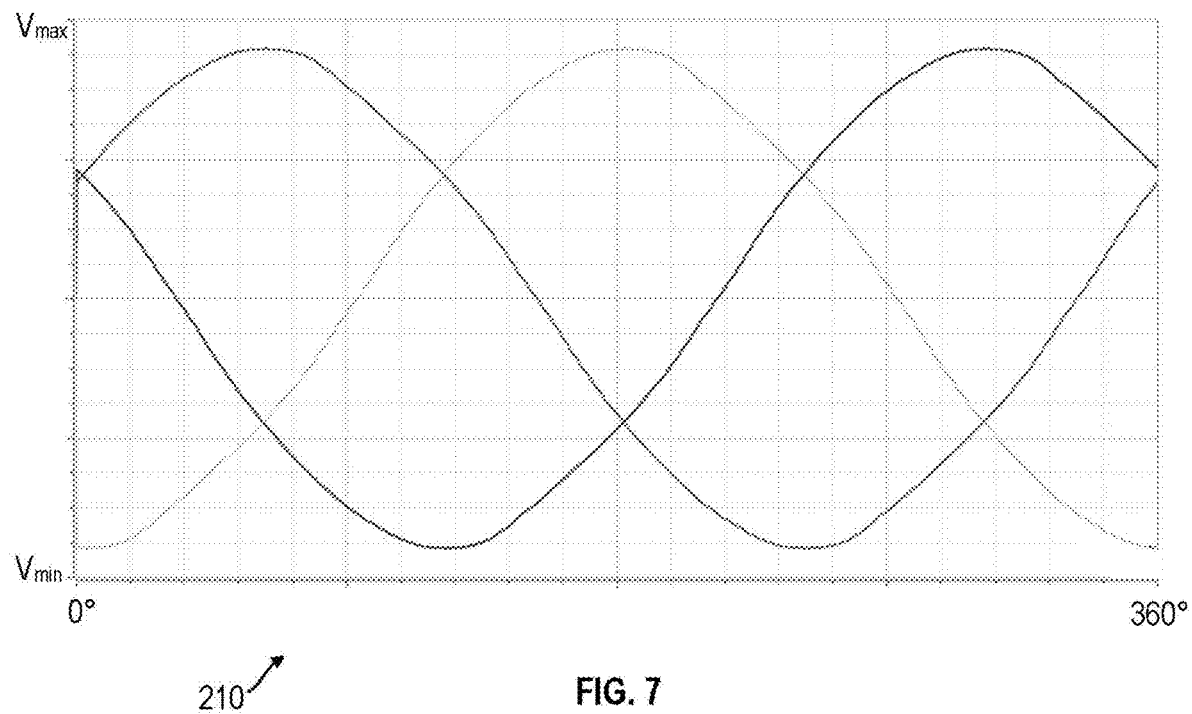
FIG. 7 shows a graph of phase voltage of the inner stator of the generator of FIG. 1.
Figure 8:
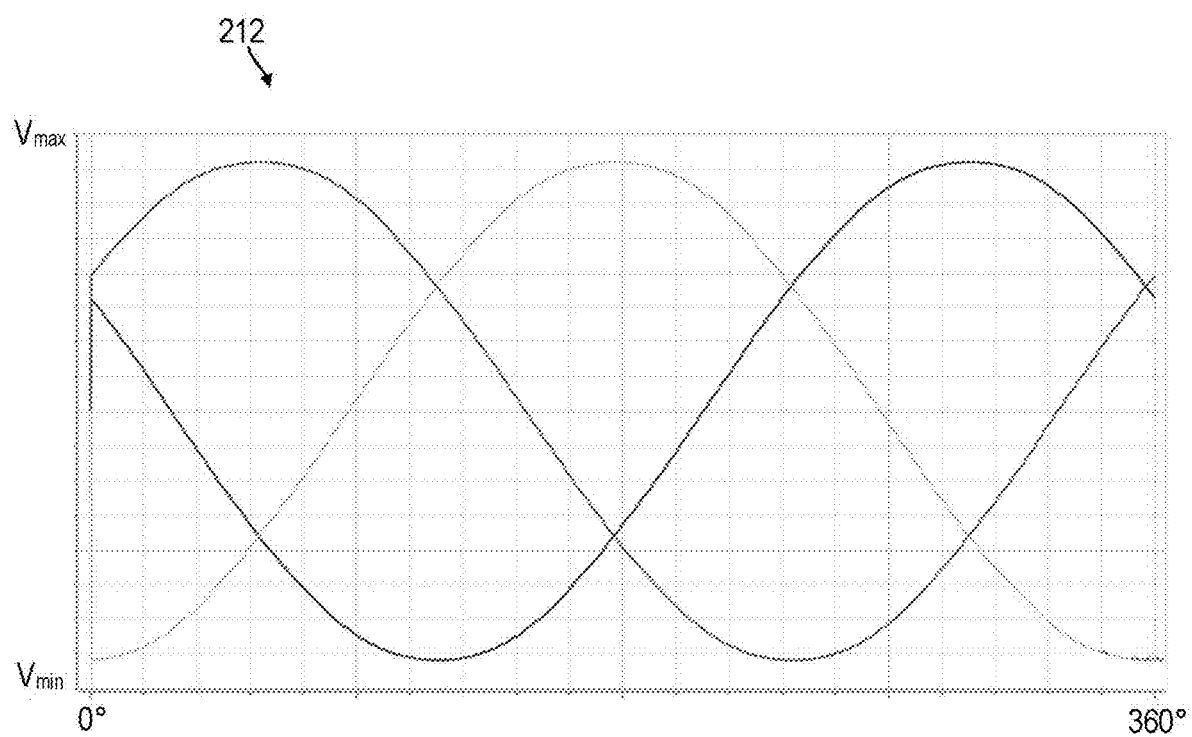
FIG. 8 shows a graph of phase voltage of the outer stator of the generator of FIG. 1.
Figure 9:
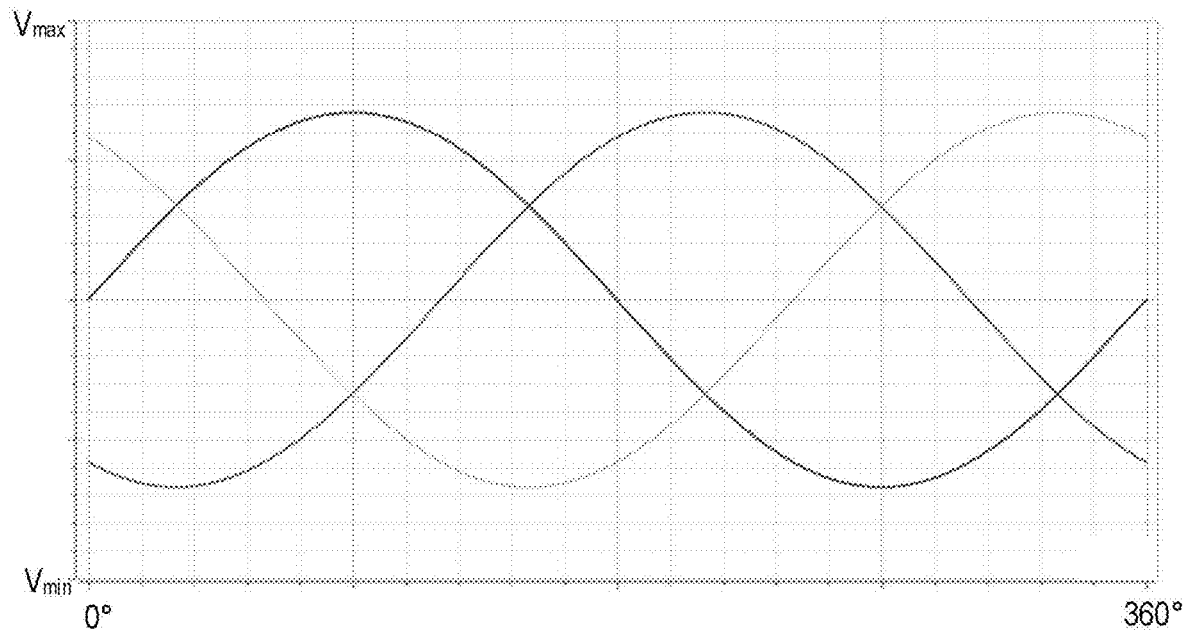
FIG. 9 shows a graph of phase current of the inner stator of the generator of FIG. 1.
Figure 10:
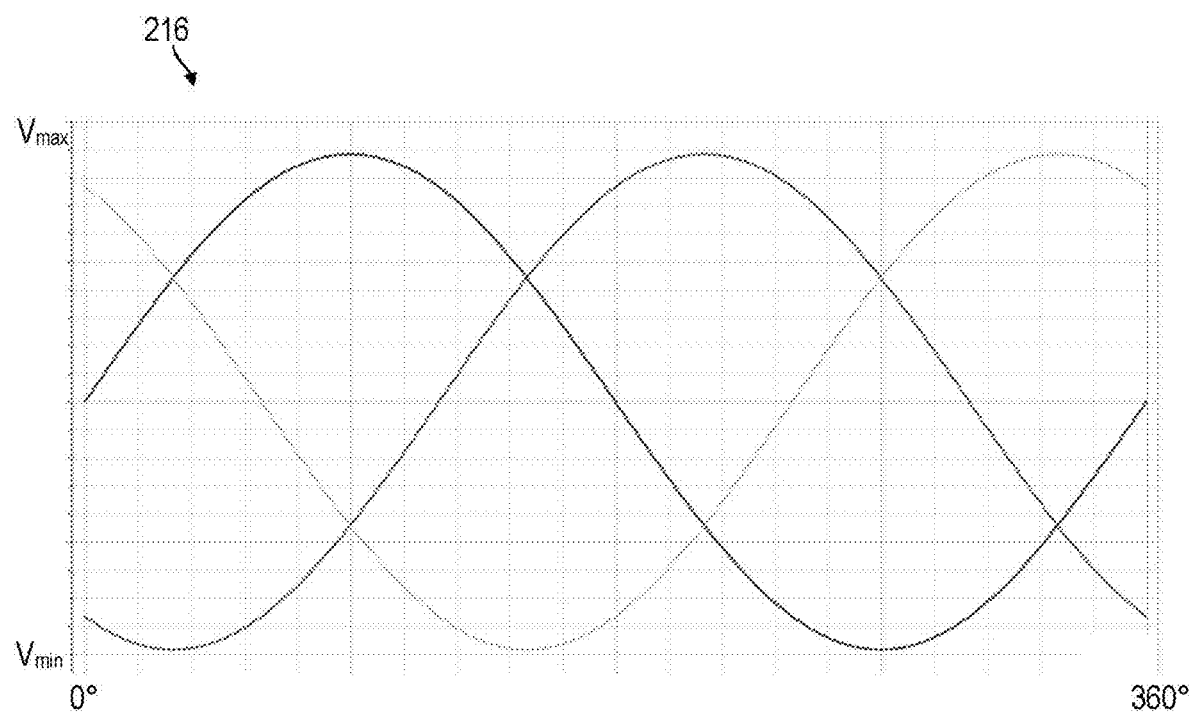
FIG. 10 shows a graph of phase current of the outer stator of the generator of FIG. 1.
Figure 11:
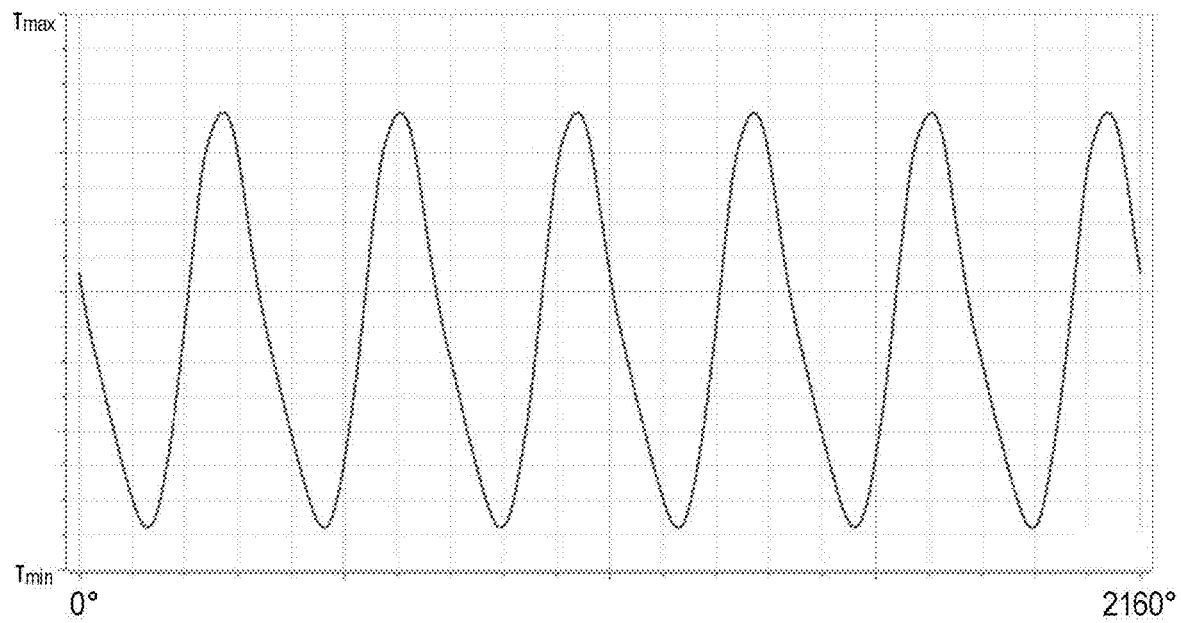
FIG. 11 shows a graph of torque of the inner stator of the generator of FIG. 1.
Figure 12:
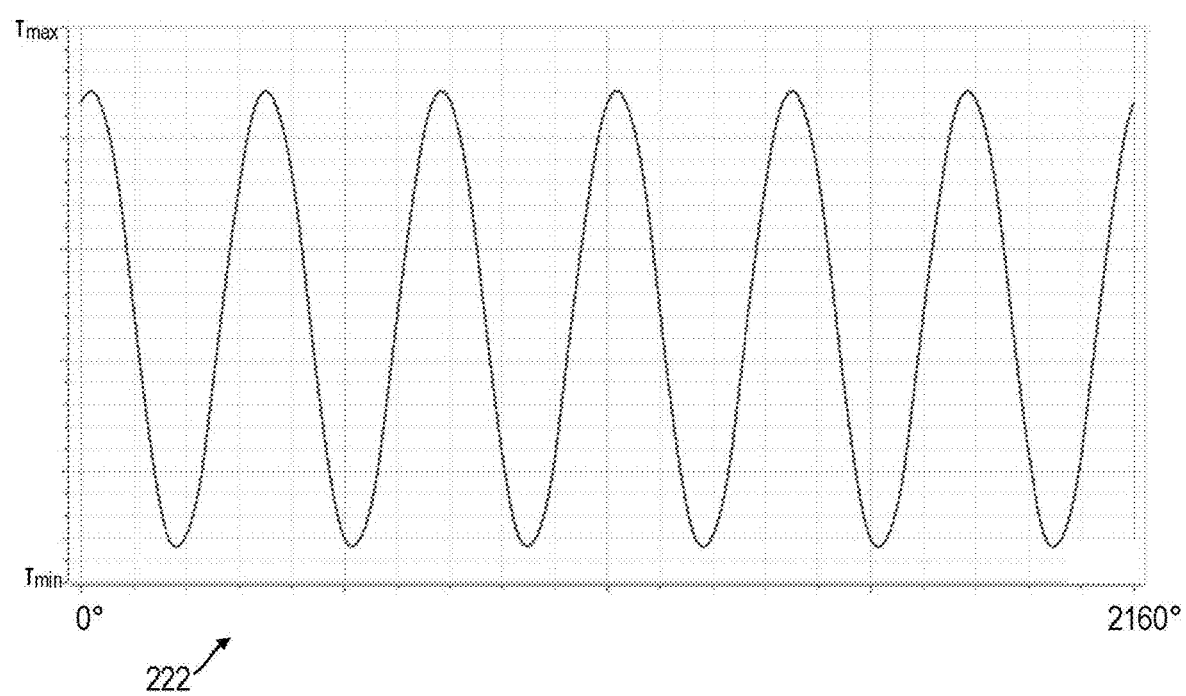
FIG. 12 shows a graph of torque of the rotor of the generator of FIG. 1.
Figure 13:
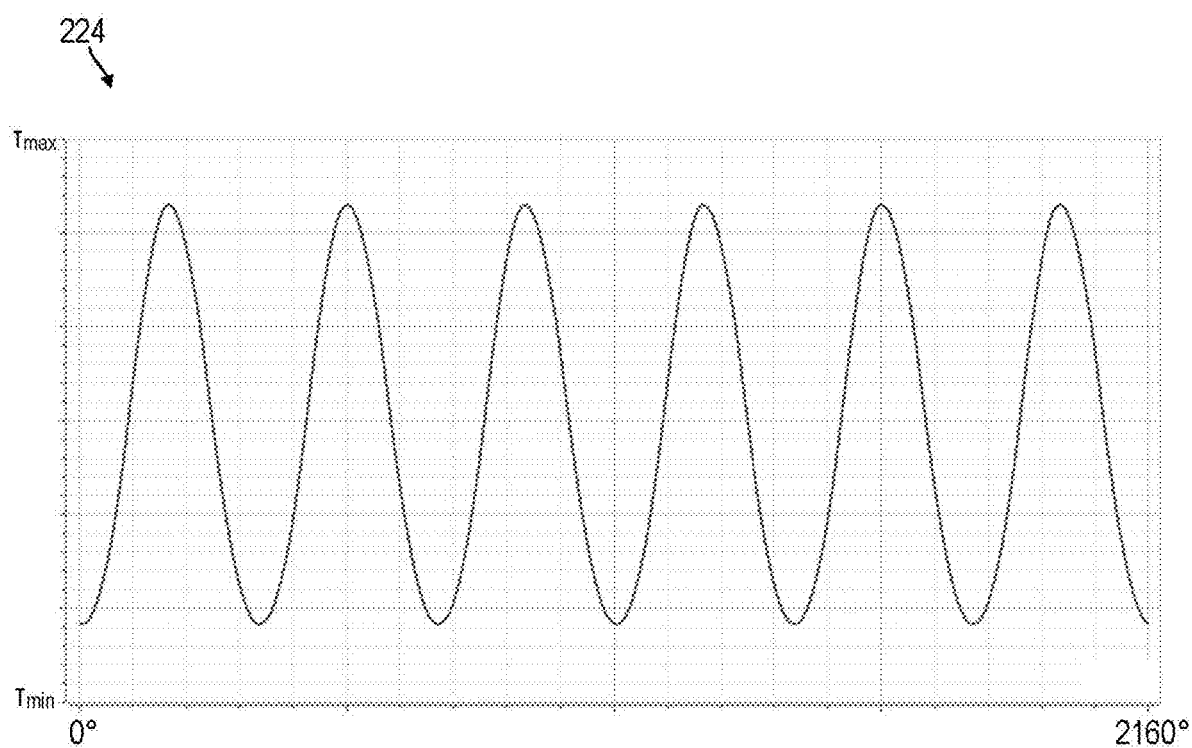
FIG. 13 shows a graph of torque of the outer stator of the generator of FIG. 1.

FIGS. 3-4 show magnetic flux density heatmaps 202, 204 of the generator 100, in use. FIGS. 5-11 show various graphs 206-224 of characteristics of the generator 100:
  graph 206 shows flux density between the inner stator 110 and the rotor 120;
  graph 208 shows flux density between the outer stator 130 and the rotor 120;
  graph 210 shows phase voltages of the inner stator 110;
  graph 212 shows phase voltages of the outer stator 130;
  graph 214 shows phase currents of the inner stator 110;
  graph 216 shows phase currents of the outer stator 130;
  graph 220 shows torque of the inner stator 110;
  graph 222 shows torque of the rotor 120; and
  graph 224 shows torque of the outer stator 130.

While the specific values of the graphs 206-224 may not be directly relevant, the shapes of the graphs 206-224 are relevant, showing the relative smoothness of the various output characteristics.

The inventor notes that the present disclosure may have other advantages and features. The magnetic field of both the inner surface and the outer surfaces of the rotor 120 is utilised. The magnetic flux reading after FFT in the inner airgap 112 may be between 0.3 T and 0.99 T and for the outer airgap 132 may be between 0.2 T and 0.95 T.

In conventional generator design, the harmonics increase with the increase in current; however, in the design of the present generator 100, good results are produced in that the quality of the electric power generated in terms of the harmonics is good. In this embodiment, when current on the inner stator 110 is kept constant, there is a reduction in harmonics (compared to conventional generator design) when the current of the outer stator 130 (specifically, the windings 134 in the outer stator 130) is increased up to a certain point, where the inner airgap 112 ranges from 15 mm to 55 mm at its shortest distance and ranges from 55 mm to 95 mm at its longest distance and the outer airgap 132 ranges from 25 mm to 55 mm at its shortest distance and ranges from 60 mm to 120 mm at its longest distance and that when raising the current of the outer stator 130 and keeping the current of the inner stator constant 110, the improvement is that the harmonics and the total harmonics distortion of the voltage on the outer stator are reduced to at least 0.44%.

From that point, the harmonics start to increase with increase in current on the outer stator 130. When the current of both the inner stator 110 and the outer stator 130 are increased, the harmonics and the total harmonic distortion percentages are reduced in both the inner stator 110 and the outer stator 130. The decrease of harmonics is more substantial in the outer stator 130. On the other hand, when the current is reduced on the outer stator 130, the harmonics on the outer stator 130 increase which is in opposition to conventional design. All this happens when the current in the inner stator 110 is maintained at a constant value (rated current). At half the rated current on outer stator, the harmonics are higher than at rated current. When the current of both the inner stator 110 and the outer stator 130 is increased, the harmonics and the total harmonic distortion percentages are reduced in both the inner stator 110 and the outer stator 130 where the inner airgap 112 ranges from 25 mm to 65 mm at its shortest distance and ranges from 45 mm to 110 mm at its longest distance and the outer airgap 132 ranges from 65 mm to 110 mm at its shortest distance and ranges from 94 mm to 140 mm at its longest distance and that when raising the current of both the inner stator 110 and the outer stator 130, the harmonics and the total harmonic distortion of both the inner stator 110 and the outer stator 132 are decreased by at least 4%.

The other beneficial embodiment is that the outer stator 130 may operate at a much higher current than conventionally designed electric power generators' current flow without compromising the quality of the electrical power. The current may be increased to more than 100% of the comparatively conventional design value and this increases the output without compromising the quality of electric power supply to the consumer. The overall harmonics increase up to 0.88% on the outer stator 130 when the current increase by 50%. The current in the outer stator 130 may still be increased by up to 100%, which will improve the performance of the generator 100 without compromising the quality in terms of the voltage harmonics of the electric power generator, at 100% increase of current the harmonics approach the 3% THD limit of the overall harmonics on the outer stator and the IEEE519 standard which is the international acceptable standard on harmonics is 3%. The outer stator 130 may generate much more power at the correct level of quality without changing the configuration.

The harmonics standard is not an immediate challenge on the outer stator 130, but the inner stator 110 reacts in opposite manner compared to the outer stator 130. The harmonics for the inner stator 110 may increase with the increase in current while the harmonics of the outer stator 130 may decrease with an increase in the current of the outer stator 130 at this level. This is the case until the current for both the inner stator 110 and the outer stator 130 is increased which is quite unexpected, where the inner airgap 112 ranges from 25 mm to 85 mm at its shortest distance and ranges from 65 mm to 100 mm at its longest distance and the outer airgap 132 ranges from 35 mm to 55 mm at its shortest distance and ranges from 63 mm to 120 mm at its longest distance and that when the current on the inner stator 110 is decreased, the harmonics and the total harmonic distortion is deceased in both the inner stator 110 and the outer stator 130 by at least 3%.

The inner stator 110 reacts the same way as the conventional generator in that when the current is increased the harmonics increase as well. The inner stator 110 may be designed for low voltage and the outer stator 130 may at the same time and for same configuration be designed for higher voltage at higher current. At this configuration of operation, the inner stator 110 may contribute as low as 13% of the total electric generator output, while the outer stator may contribute 87% of the electric output power. When the current of the outer stator 130 is increased above a certain point the harmonics on the inner stator 110 decrease; that is, when the current of the outer stator 130 is increased by +100% the harmonics on the inner stator 110 decrease by 10%, so this may show that the optimal operating point for the harmonics to be within acceptable standard is to operate the outer stator 130 at a higher current. This operation requires that the outer stator 130 be made bigger so that bigger conductors can be used on the outer stator 130 to carry more current. The inner stator 110 can also be made bigger to accommodate the bigger conductors. There is a surprising outcome in that when the inner stator 110 is offline, and the outer stator 130 is on-load, the outer stator harmonics do not change.

The fact that there are two airgaps 112, 132 mean that the two dispersion layers of the magnetic poles can be used. Therefore, this arrangement enables both the two surfaces of the rotor 120 to be utilised to generate the electric power. It may be an advantage of this disclosure to utilise the magnetic field on both surfaces of the magnetic pole structures 122, 124. This previously unused magnetic field is on the surface attached to the rotor surface shaft in conventional design, this magnetic field is technically of the same size and the same properties as the other surface which is utilised. In conventional design, the generator has one rotor and one stator which leads to a situation where the other surface of the magnet pole, even though it has all the properties of the surface which is utilised, this other surface is never utilised.

The airgaps 112, 132 and magnetic fluxes may play an important role because they affect the performance and the quality of the power generated by generator 100. The inner airgap 112 may be between 5 mm and 50 mm in the centre of the pole and increases to between 10 mm and 90 mm at the end of the pole and outer airgap 132 may be between 20 mm and 100 mm at the centre of the pole and increases to between 35 mm and 165 mm at the end of the pole. The FFT Br values (magnetic flux) reading in the midpoint of the inner airgap 112 between inner stator and magnetic pole on the rotor may be 0.3 T and 0.99 T and for the outer airgap 132 may be between 0.2 T and 0.95 T. Because of the increase in the outer airgap 132, the magnetic flux reading may be very low compared to that of the inner airgap 112. Low flux reading leads to low voltage generation.

To resolve this low voltage generation, a diameter/size of the outer stator 130 may be increased, which increases the voltage generated by more windings 134 and also by increasing the outer stator slot size (depth) and use bigger size conductors or use more windings 134. Even though the magnetic field travels a long distance to the outer airgap 132, the overall size of the outer stator 130 makes up for the low magnetic flux density. The inner stator 112 may generate low voltage while the outer stator 130 may generate higher voltage which improves the performance and flexibility of this generator 100. The generator 100 may generate higher voltage on both the inner stator 110 and outer stator 130, and also the two stators 110, 130 may generate low voltage which when compared with the higher voltage on the stators is like almost degrading the generator. (Low voltage is generally regarded as voltage below 1000 V and high voltage is regarded as voltage above 1000 V.) Comparing the low voltage and the high voltage the higher voltage can generate much more power compared to the low voltage without changing the configuration. This design maybe more suitable for application in low fuel cost use especially the renewables like Wind, Hydro and Geothermal.

The generator 100 may have many characteristics for commercial success based on its low voltage harmonics which enables it to produce a much higher level of current and therefore to generate a lot of power for its size. There has been a long felt need for an affordable and better quality power. This embodiment provides the solution for that unmet market need. This level of the quality of power brings along with it a lot of economic and safety benefits for the user of the electricity and also for the transmission and distribution of the electric power. It also brings benefits to harmonics sensitive electrical equipment. The high level of power output drives the power/mass (kW/kg) ratio higher compared to prior art generators. This capability of the generator 100 drives down the capital outlay cost in terms of cents/kW. The low harmonics come as an unexpected superior effect where the presence of the two stators 110, 130 and the single rotor 120 work synergistically together to effect the production of low voltage harmonics.

When the current on the outer stator 130 is increased, the harmonics of the inner stator 110 and the outer stator 130 decrease in contrast to the conventional generators where when the current of the single stator is increased the harmonics increase as well. The other contrasting superior effect is that when the inner stator 110 is on load and then the outer stator 130 is loaded, there is a noticeable decrease of the input power into the generator 100. When increasing the current on both the inner stator 110 and the outer stator 130, the voltage harmonics for the two stators 110, 130 keep on decreasing.

Clauses

1. A Three-layer Electric Power Generator with a rotor between two stators whereby the Air-gap between the inner stator and the inner surface of the magnet pole rotor is between 5 mm and 50 mm in the centre of the pole and increases to between 10 mm and 90 mm at the end of the pole and the outer stator air-gap between the outer surface of the rotor and the inner surface of the outer stator is between 20 mm and 100 mm at the centre of the pole and increases to between 35 mm and 130 mm at the end of the pole and the FFT Br value (magnetic flux) reading in the midpoint of the inner air-gap between inner stator and magnetic pole on the rotor is 0.3T and 0.7T reading and for the outer air-gap which is between the outer surface of the magnetic pole on the rotor and the inner surface of the outer stator is between 0.2T and 0.6T.
2. An Electric Power Generator according to clause 1 whereby the improvement is that the rotor is smaller than conventional rotor for a comparable Power output.
3. An Electric Power Generator according to clause 1 whereby the improvement is that the stator is bigger in size than of the conventional stator.
4. An Electric Power Generator according to clause 1 whereby the inner air-gap is between 5 mm and 50 mm in the centre of the pole and increases to between 10 mm and 90 mm at the end of the pole and outer stator air-gap is between 20 mm and 100 mm at the centre of the pole and increases to between 35 mm and 130 mm at the end of the pole with the improvement that the harmonics on the outer stator decreases with increasing current in the outer stator only.
5. An Electric Power Generator according to clause 1 whereby the inner air-gap is between 5 mm and 50 mm in the centre of the pole and increases to between 10 mm and 90 mm at the end of the pole and outer stator air-gap is between 20 mm and 100 mm at the centre of the pole and increases to between 35 mm and 130 mm at the end of the pole and the with the improvement that the harmonics on the inner stator decreases with increasing current from a rated current point in the outer stator only.
6. An Electric Power Generator according to clause 2 whereby the improvement is that the stator windings are wound one on top of the other in a spiral form.
7. A Three-Electric Power Generator according to clause 1 which is characterised by operating the outer stators with a higher current and still maintain the correct harmonics level.
8. A Three-layer Electric Power Generator according to clause 1 which is characterised in that the inner stator may generate low voltage and the outer stator may generate higher voltage or both may generate high voltage.

9. A Three-layer Electric Power Generator according to clause 1 wherein V The electric power generator of claim 1, wherein the inner airgap ranges from 5 mm to 50 mm at its shortest distance and ranges from 10 mm to 95 mm at its longest distance; and the outer airgap ranges from 20 mm to 140 mm at its shortest distance and ranges from 30 mm to 165 mm at its longest distance.

The invention claimed is:

1. An electric power generator comprising a rotor and a plurality of stators, wherein:
    the rotor and the plurality of stators are arranged coaxially and concentrically about a central axis;
    the plurality of stators includes an inner stator provided radially inwardly of the rotor, the inner stator and the rotor being separated by an inner airgap;
    the plurality of stators includes an outer stator provided radially outwardly of the rotor, the outer stator and the rotor being separated by an outer airgap;
    each of the inner and outer stators have respective windings configured to have electric current induced therein;
    the rotor includes a plurality of magnetic pole structures configured to provide or generate a magnetic field having plurality of magnetic poles configured, in use, to induce the current in the windings; and
    the rotor is not of uniform cross-sectional thickness, wherein:
        an inner surface of the rotor bulges radially inwardly at the pole structures, the inner airgap thus being non-uniform in that it is radially shorter at the pole structures and radially longer in between the pole structures; and
        an outer surface of the rotor bulges radially outwardly at the pole structures, the outer airgap thus being non-uniform in that it is radially shorter at the pole structures and radially longer in between the pole structures.

2. The electric power generator of claim 1, wherein the rotor has an average or medium radius of curvature and radially inner and outer surfaces between the pole structures have a radius of curvature concentric with the average radius of curvature.

3. The electric power generator of claim 1, wherein:
    the outer surface of each magnetic pole structure has a smaller radius of curvature than a displacement arc which it describes; and
    the inner surface of each magnetic pole structure has a larger radius of curvature than a displacement arc which it describes.

4. The electric power generator of claim 1, wherein the outer airgap is, on average, radially longer or wider than the inner airgap.

5. The electric power generator of claim 1, wherein the inner airgap is 5-50 mm at its radially shortest point.

6. The electric power generator of claim 1, wherein the inner airgap is 10-95 mm at its radially longest point.

7. The electric power generator of claim 1, wherein the outer airgap is 20-100 mm at its radially shortest point.

8. The electric power generator of claim 1, wherein the outer airgap is 30-165 mm at its radially longest point.

9. The electric power generator of claim 1, wherein the rotor includes intermediate support structures between adjacent magnetic pole structures to provide a constant or uninterrupted circumferentially extending rotor.

10. The electric power generator of claim 1, wherein the inner stator presents a generally circular outer surface and the inner airgap is generally uniform at its inner boundary provided by the outer surface of the inner stator but non-uniform at its outer boundary provided by the inner surface of the rotor.

11. The electric power generator of claim 1, wherein the outer stator presents a generally circular inner surface and the outer airgap is generally uniform at its outer boundary provided by the inner surface of the outer stator but non-uniform at its inner boundary provided by the outer surface of the rotor.

12. The electric power generator of claim 1, wherein:
    the inner airgap ranges from 15 mm to 55 mm at its shortest distance and ranges from 55 mm to 95 mm at its longest distance;
    the outer airgap ranges from 25 mm to 55 mm at its shortest distance and ranges from 60 mm to 120 mm at its longest distance; and
    when increasing current of the outer stator and keeping current of the inner stator constant, total harmonics distortion of the voltage on the outer stator are reduced to at least 0.44%.

13. The electric power generator of claim 1, wherein:
    the inner airgap ranges from 25 mm to 65 mm at its shortest distance and ranges from 45 mm to 110 mm at its longest distance;
    the outer airgap ranges from 65 mm to 110 mm at its shortest distance and ranges from 94 mm to 140 mm at its longest distance; and
    when increasing current of both the inner stator and the outer stator, harmonics and total harmonic distortion of both the inner stator and the outer stator are decreased by at least 4%.

14. The electric power generator of claim 1, wherein:
    the inner airgap ranges from 25 mm to 85 mm at its shortest distance and ranges from 65 mm to 100 mm at its longest distance;
    the outer airgap ranges from 35 mm to 55 mm at its shortest distance and ranges from 63 mm to 120 mm at its longest distance; and
    when current on the inner stator is decreased, harmonics and total harmonic distortion is deceased by at least 3% in both the inner stator and the outer stator.

15. The electric power generator of claim 1, wherein:
    the inner airgap ranges from 5 mm to 50 mm at its shortest distance and ranges from 10 mm to 95 mm at its longest distance; and
    the outer airgap ranges from 20 mm to 140 mm at its shortest distance and ranges from 30 mm to 165 mm at its longest distance.

* * * * *